June 23, 1942.   C. E. GIFFORD ET AL   2,287,302
POWER TAKE-OFF
Filed Dec. 6, 1940   2 Sheets-Sheet 1
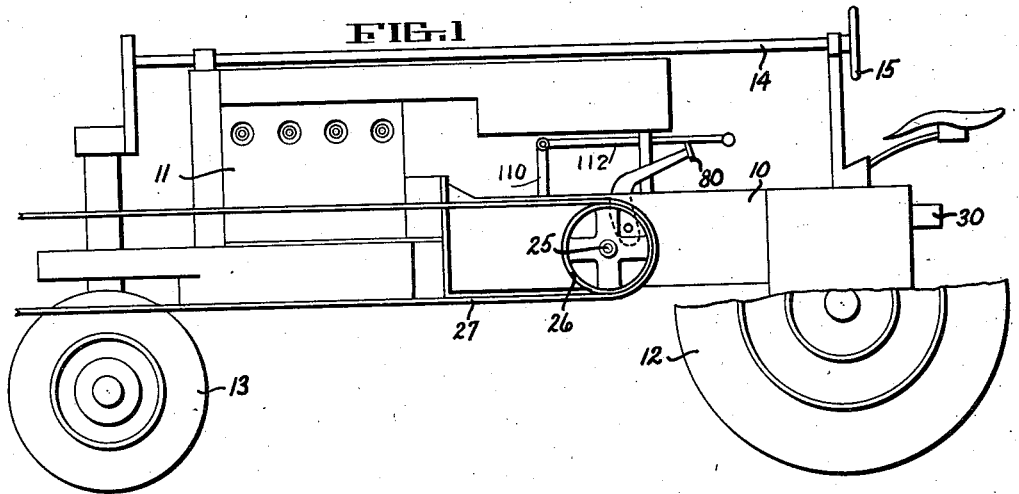
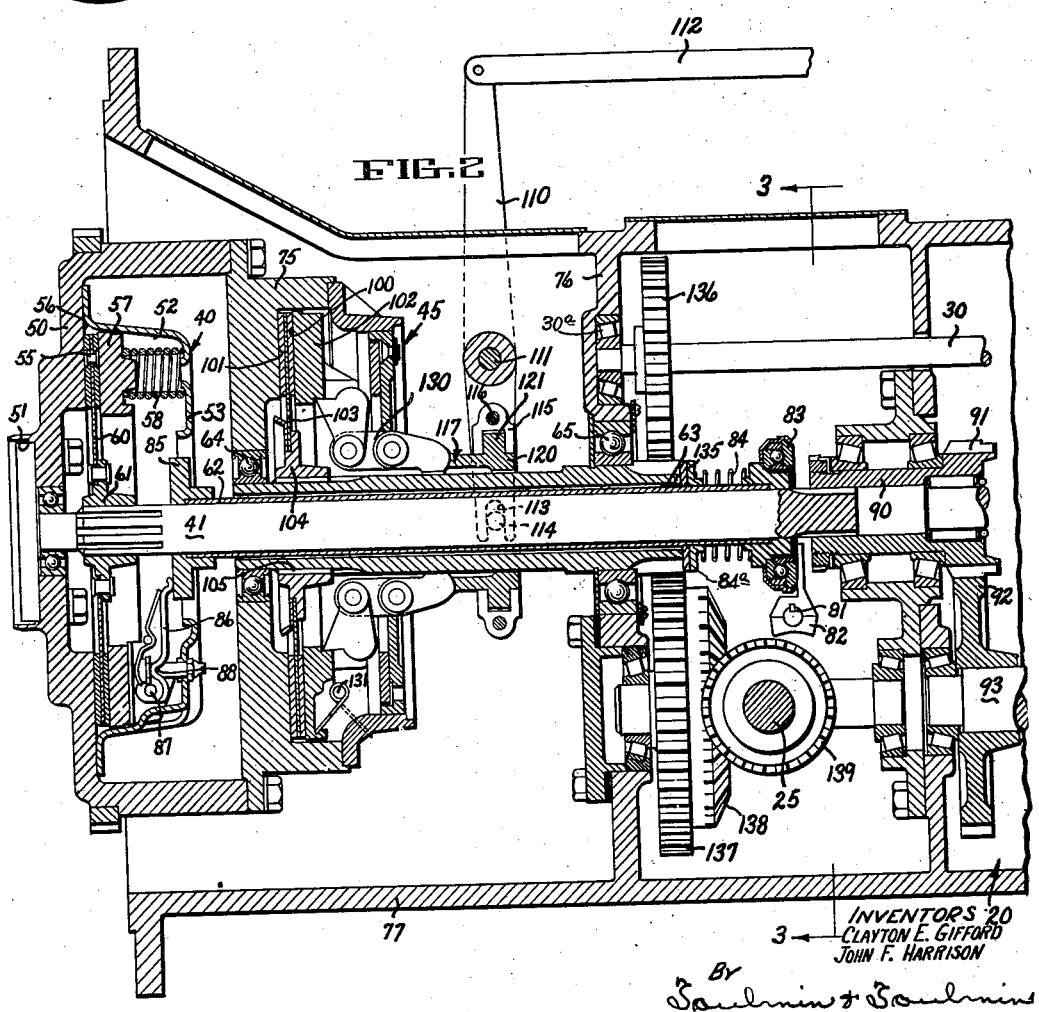
INVENTORS
Clayton E. Gifford
John F. Harrison
By Toulmin & Toulmin
ATTORNEYS

INVENTORS
CLAYTON E. GIFFORD
BY JOHN F. HARRISON
ATTORNEYS

Patented June 23, 1942

2,287,302

UNITED STATES PATENT OFFICE 2,287,302

POWER TAKE-OFF

Clayton E. Gifford and John F. Harrison, Marion, Ohio, assignors to The Huber Mfg. Company, Marion, Ohio, a corporation of Ohio Application December 6, 1940, Serial No. 368,898

3 Claims. (Cl. 74—11)

This invention relates to tractors for use in transporting farm machinery in the field and for providing power for operating the mechanisms of the various farm machinery connected thereto.

It is quite conventional to provide tractors for use on farms wherein there is provided a power take off for operating various pieces of farm machinery. These power take offs, however, have not been entirely successful for satisfactory operation of the farm machinery when operating in the field. The former tractor power take off drives have been dependent upon operation of a single clutch mechanism whereby the power take off and the transmission for the tractor were controlled by a common clutch mechanism. With such an arrangement, it is necessary that the power take off must stop operation whenever the gears of the transmission are to be shifted.

When a tractor is transporting a piece of farm machinery through a field, and also operating the piece of machinery through the power take off, the stopping of the power take off to permit shifting of the transmission prevents the operation of the farm machinery during the period of gear shifting. Such an arrangement permits the farm machinery to skip various areas of the crop being worked upon and many times causes the machine to jam since the machine will be moving forward through the crop without the mechanism thereof being in operation. Such an arrangement is particularly objectionable when starting a piece of equipment from a standing stop, since the power requirement for starting the forward motion of the machinery across the field, and for starting the mechanism thereof in operation for gathering the crop, is usually too great for the average tractor. Such an arrangement prevents the mechanism of the harvesting apparatus from operating at its normal operating speed at the beginning of the forward motion of the apparatus and will be delayed until the machinery has sufficient forward momentum to relieve the load on the tractor. A portion of the crop will thus be permitted to remain unharvested, or the machine will become jammed with excess crop material.

It is thus an object of this invention to provide a tractor wherein the power take off is independently controlled from the drive mechanism.

It is another object of the invention to provide independently operated clutch means for controlling the connection of the engine with the transmission, and with the power take off drive.

It is a further object of the invention to provide a power take off mechanism wherein a clutch is provided for connecting the engine of the tractor to the drive mechanism therefor, and a separate clutch is provided for controlling the connection of the engine with the power take off drive, and which clutches may be in operation either individually or simultaneously.

It is a still further object of the invention to provide a power take off drive for a tractor which is operated independently of the driving mechanism for the tractor to permit the power take off drive to be operated continuously while shifting the gears in the transmission, whereby the farm machinery driven by the power take off is operated continuously whether the machinery is being transported through a field, or is operating at a stationary position.

It is another object of the invention to provide a power take off mechanism for a tractor wherein two power take off drives may be operated simultaneously.

It is another object of the invention to provide a mechanism in accordance with the foregoing object wherein the power take off drives may be operated by the tractor, regardless of the clutching or de-clutching operation of the driving mechanism for moving the tractor over the ground.

A still further object of the invention is to provide a simplified and compact clutch arrangement for permitting the driving mechanism for the tractor, and the power take off drive to be operated individually or concomitantly.

It is another object of the invention to provide a tractor having a power take off drive wherein individual clutches are provided for the driving means, and for the power take off, and which clutches can be individually operated without interfering with the separate and individual functions of the independent clutch means.

It is another object of the invention to provide a pair of power take off drives for a tractor wherein one of the drives extends transversely of the tractor, and the other drive extends longitudinally thereof.

Further objects and advantages will be made apparent from the following description and the drawings.

In the drawings:

Figure 1 is a side elevational view of a tractor.

Figure 2 is a cross-sectional view of the power take off and clutch mechanism for practicing the principles of the invention.

Figure 3:
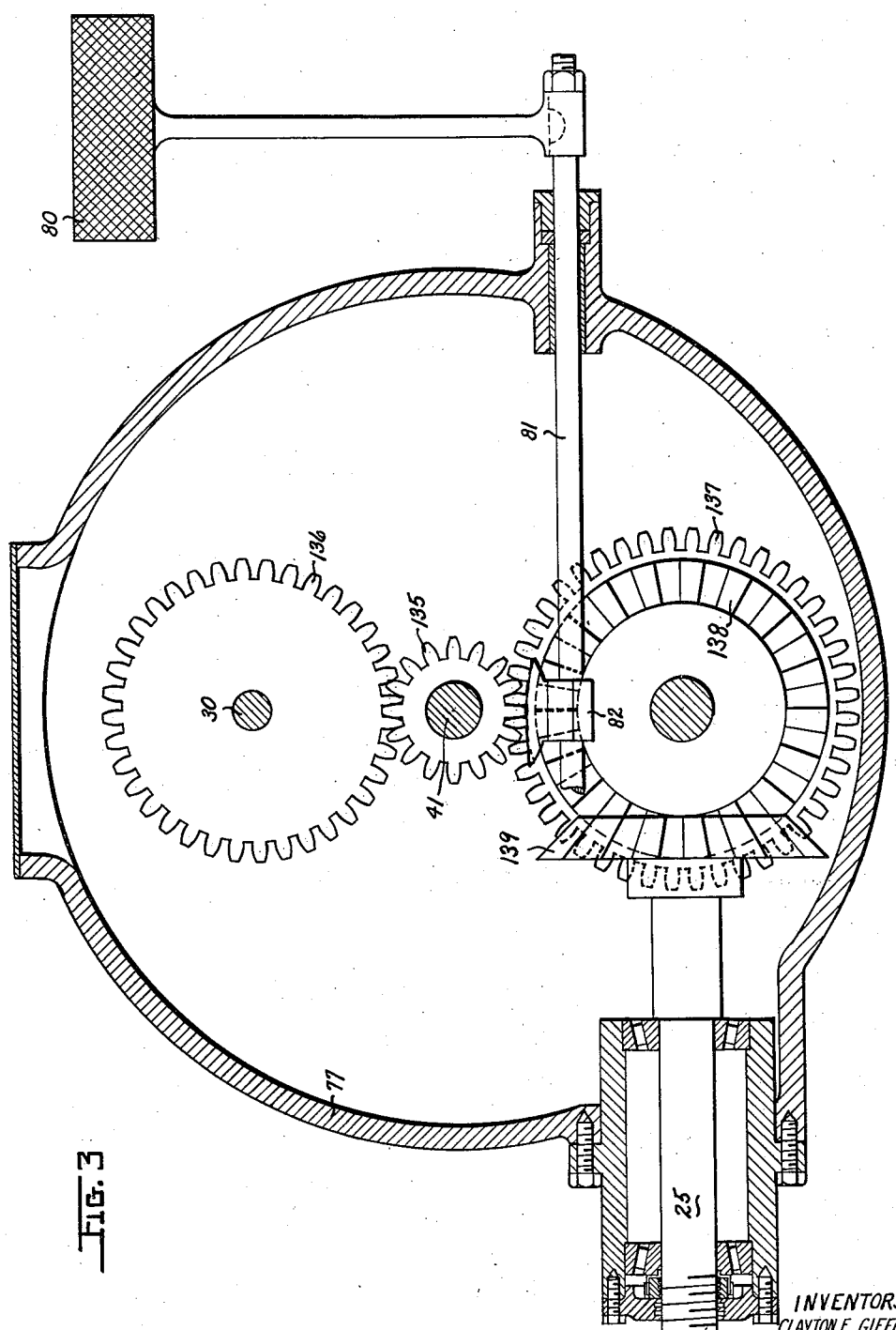
Figure 3 is a cross-sectional view taken substantially along line 3—3 of Figure 2.

Farm tractors, as used at the present time, furnish power for pulling farm machinery through the fields for harvesting various crops, and for providing a power source for operating the mechanism of the various harvesting machines, such as combines, corn pickers or other apparatus. The tractor of this invention is provided with an apparatus whereby the control of the forward motion of the tractor and the apparatus being pulled thereby is independent of the apparatus for controlling the power take off drive. The arrangement of apparatus is such that the tractor engine can be clutched or de-clutched from driving engagement with the wheels of the tractor without interfering with the clutching or de-clutching of a power take off. The power take off can operate continuously when the gears of the transmission of the tractor are shifted to control the forward motion thereof. The operation of the forward motion of the tractor and the operation of the power take off are such that they can be operated independently or concomitantly, each of the control apparatus having individual selective control means.

This invention can be used upon any conventional tractor which is arranged to receive the clutch mechanism of the invention. Figure 1 discloses, in a general way, a conventional tractor having a frame 10 upon which an engine 11 is suitably mounted. The engine 11 can be of any conventional type which burns any of the conventional fuels, such as fuel oil, kerosene, or gasoline. Suitable traction wheels 12 are carried by the frame 10, and are in driving engagement with the engine 11 by means of suitable interconnecting gearing and drive shafts. The forward end of the frame 10 supports the steering wheels 13, which are controlled in conventional manner, by means of the steering shaft 14 and the hand wheel 15. A suitable transmission 20 is interposed between the engine 11 and the driving wheels 12 for controlling the speed of operation of the tractor over the ground. The transmission is of any conventional type and has the desired forward and reverse speeds for causing proper operation of the tractor.

The tractor of this invention is provided with a power take off 25 which extends transversely of the frame 10, whereby the power take off can be provided with a power driven pulley 26 around which a belt 27 is arranged for providing power means for driving various farm machinery. A second power take off drive 30 extends from the rear of the tractor, and provides the means by which power is furnished to a piece of farm machinery drawn behind the tractor, suitable interconnecting driving shafts being positioned between the power take off 30 and the farm machinery apparatus.

The power take off of this invention consists of a clutch 40 which is adapted to drive a shaft 41. The shaft 41 is the main drive shaft between the engine 11 and the transmission 20 for coupling the engine to the drive wheels 12 through the transmission 20 for forward or rearward operation of the tractor. A second clutch 45 is arranged coaxially with the clutch 40 and is arranged to drive a sleeve 63, which sleeve provides means for driving the power take off drive shafts 25 and 30 respectively.

The clutch 40 consists of a housing 50 which provides the fly-wheel for the engine 11, the fly-wheel being suitably secured to the output shaft of the engine 11 by any one of a number of conventional constructions. The output shaft of the engine 11 suitably extends within the recess 51 provided in the housing 50 and is secured therein to cause rotation of the housing when the engine is operating. The housing 50 is provided with a recess 52 within which the clutch 40 is positioned.

The clutch 40 consists of an enclosing housing 53 which is suitably secured to the housing member 50, and provides an enclosure therewith within the recess 52 for enclosing the clutch mechanism.

A friction disk 55 is interpositioned between the face 56 of the housing 50 and a pressure plate 57. The pressure plate 57 normally forces the friction disk 55 into engagement with the face 56 of the housing 50, suitable springs 58 being provided around the circumference of the pressure plate for this purpose. The springs 58 are held under compression between the pressure plate 57 and the enclosing housing 53. The friction disk 55 is carried upon a supporting disk 60 which has a central hub 61 secured thereto. The hub 61 is splined upon the drive shaft 41 to permit the same to move longitudinally upon the shaft when the clutch is operated by the de-clutching mechanism.

The drive shaft 41 is freely journaled within a sleeve 62, which in turn is freely journaled within a sleeve 63. The sleeve 62 is carried by the drive shaft 41 which is free to rotate therein, the sleeve 62 being reciprocal within the sleeve 63 and upon the shaft 41. The sleeve 63 is bearinged at its opposite ends by means of the ball bearings 64 and 65. The ball bearing 64 is carried within the housing 75 of the clutch 45, while the bearing 65 is carried within a wall 76 of the casing 77, the casing 77 enclosing the operating mechanisms of the clutches and the transmission.

The clutch 40 is adapted to be operated by means of a clutch operating lever 80 which is connected to a rotatable shaft 81, the shaft 81 having a lever 82 secured thereto. The end of the lever 82 engages a thrust bearing 83 which is secured to the sleeve 62. A spring 84 surrounds the sleeve 62 and is positioned between the thrust bearing 83 and an oil seal ring 84a which surrounds the sleeve 63, the spring 84 holding the ring 84a in engagement with the end of the sleeve 63. The springs 58 normally urge the pressure plate 57 in a leftward direction to engage the clutch disk 55. When the clutch 40 is to be released, actuation of the lever 80 rotates the shaft 81 to cause the lever 82 to move the sleeve 62 in a leftward direction, the sleeve 62 reciprocating within the sleeve 63. The left-hand end of the sleeve 62 is provided with a flanged plate 85 which engages a lever mechanism 86, the lever mechanism being pivotally mounted at 87 upon the pressure plate 57.

When the sleeve 62 is moved in the left-hand direction the flanged plate 85 pivots the lever 86 about the fulcrum 88 to cause the pivoted end 87 of the lever 86 to move the pressure plate 57 in the rightward direction against the pressure of the springs 58, whereby the friction disk 55 is released. The springs 58 provide for normal return engagement of the clutch 40 when the lever 80 is released.

While the clutch 40 has been described as a spring engaged friction clutch mechanism it is to be understood that the particular mechanism can be varied to meet structural and load requirements, the over center type of clutch mechanism being preferable where load conditions are heavy.

This clutch mechanism 40 drives the transmission 20 through the drive shaft 41, the right-hand end of which is splined in engagement with a shaft 90. The end of the shaft 90 carries a pinion 91 which is in proper geared relation with a transmission gear 92, whereby power is transmitted through the transmission through the shaft 93. It may thus be seen that the clutch 40 will cause engagement and disengagement of the transmission 20 with the engine 11 of the tractor by suitably operating the clutch lever 80.

The second clutch member 45 is provided for connecting the engine 11 with the power take off drives 25 and 30 respectively. This clutch mechanism consists of the housing 75 which is suitably secured to the fly-wheel housing 50 and forming a part of the fly-wheel. A friction disk 100 is positioned adjacent the friction face 101 of the housing 75 and is adapted to be caused to engage the same by means of a pressure plate 102. The friction disk 100 is carried by a supporting disk member 103 which carries a hub 104. The hub 104 is splined upon the sleeve 63, as indicated at 105, whereby a driving connection is made between the housing 75 and the sleeve 63 through the friction disk 100.

The clutch 45 is of a type which can be referred to as a two-position clutch, that is, a clutch which is neither normally engaged or disengaged, but which can be shifted to either engagement or disengagement by means of a suitable shifting mechanism which retains the clutch mechanism in either an engaged or disengaged position.

The shifting mechanism for the clutch 45 consists of a shifting lever 110 which is pivoted about a shaft 111 extending transversely through the casing 77. One end of the lever 110 is connected with an operating lever 112 while the opposite end of the lever 110 is provided with a fork 113. The fork 113 engages a pin 114 secured to opposite sides of a split bearing 115. The split bearing 115 is suitably secured together by means of bolts 116, and carries a shifting mechanism 117 for the clutch 45.

The shifting mechanism 117 consists of a flanged cylinder 120, surrounding the sleeve 63, having flanged ends 121 in engagement with the split bearing 115 whereby the shifting mechanism 117 will be moved longitudinally along the sleeve 63 when the shifting lever 110 is operated, yet permitting rotation of the shifting mechanism 117 when the clutch 45 is in engaged position.

The shifting mechanism 117 is provided with a lever system 130 which is adapted to frictionally engage the pressure plate 102 when the shifting mechanism 117 is moved in the leftward direction, whereby the pressure plate 102 is caused to move into engagement with the friction disk 100 and cause the same to be bound between the pressure plate 102 and the face 101 of the housing 75, whereby the friction disk 100 will drive the sleeve 63. Movement of the shifting lever 110 in the opposite direction will cause the shifting mechanism 117 to move in a rightward direction whereby the lever mechanism 130 is released from the pressure plate 102 to permit the springs 131 to remove the pressure plate 102 from engagement with the friction disk 100.

The clutch mechanism 45 thus provides means whereby power is transmitted from the flywheel 50 of the engine 11 to the drive sleeve 63. The drive sleeve 63 is provided with a pinion 135 on the end thereof which is arranged in proper gear mesh relation with the spur gears 136 and 137. The gear 136 is suitably keyed to the longitudinal power take off shaft 30, the shaft 30 being suitably bearinged within the casing 77 as by the bearing member 30a in the wall 76, and arranged to extend from the rearward end of the tractor. The gear 137 is provided with a bevel gear 138 which engages a bevel gear 139 secured upon the transverse power take off shaft 25, the latter gear train provides means to drive the power shaft extending transversely of the tractor.

The bearings 30a and 65 are provided with suitable closure walls to prevent oil in the transmission 20 from entering the clutch mechanism chambers.

When the tractor is to be used as the power source for transporting a piece of harvesting equipment, and for providing the required power source for operating the mechanism of the harvesting equipment, the harvesting machine is suitably coupled to the tractor by any conventional apparatus so that the harvesting mechanism can trail the tractor. The power driven shaft of the operating mechanism of the harvesting machine is suitably coupled to the power take off drive 30. The coupling device may be of any conventional structure and hence is not further disclosed or described, since this coupling drive shaft is common to all tractors and harvesting mechanisms.

The particular coupling of the power take off mechanism and the mechanism for causing forward movement of the tractor permit the harvesting mechanism to be operated independently of the operation of the drive mechanism for the tractor.

Under normal conditions the clutch 40 is in engaged position whereby a drive is established between the fly-wheel 50 and the drive shaft 41. The normal position of the clutch 45 would usually be in the disengaged position to prevent operation of the power take off drives. When the clutches are in their respective normal positions the tractor is in condition for transporting harvesting mechanism connected thereto across a field. The transmission 20 can be shifted in the conventional manner by means of operation of the clutch 40 to permit the tractor to move the harvesting mechanism forward.

When it is desired to cause the mechanism of the harvesting machine to operate for harvesting purposes the clutch 45 will be operated by the shifting rod 112 to cause driving engagement between the housing 75 and the sleeve 63. The engagement of the clutch 45 can be made at any time the tractor is in motion or at a standstill since the clutch 45 is entirely independent in its operation from the clutch 40. It may thus be seen that while the tractor is moving the harvesting mechanism across the field the clutch 45 may be thrown in engagement to start operation of the harvesting mechanism.

At any time it is desired the clutch 40 may be disengaged to permit shifting of the transmission 20 into neutral and thereby stop forward motion of the tractor. This operation may be carried out without interfering with the engagement of the clutch 45, whereby forward motion of the tractor and harvesting equipment will be halted without stopping operation of the harvesting mechanism. It may thus be seen that the forward movement of the tractor and harvesting device can thus be started and stopped at will without stopping the operation of the harvesting mechanism.

This arrangement thereby provides an apparatus which will permit halting of the forward motion of the harvesting device and yet permit retention of the speed of operation of the harvesting mechanism so that when the harvesting device is again started in its forward motion across the field the harvesting mechanism will be operating at full speed at the beginning of the forward motion. Under conditions, as heretofore existing, the de-clutching of the transmission for shifting gears in the tractor would de-clutch the power take off drive whereby the harvesting mechanism would stop when forward motion of the apparatus was to be started. Such former arrangements drew tremendously upon the power reserve of the tractor and prevented the harvesting mechanism from immediately obtaining its full speed at the beginning of the forward motion of the tractor. The arrangement of this invention eliminates this disadvantage since the harvesting mechanism can be maintained at its normal operating speed regardless of whether the tractor is in motion or at a standstill, or whether the gears of the transmission are being shifted.

While the drawings herein disclose a preferred form of the invention, yet there are various mechanical modifications which will perform the function of this invention, all of which are to be considered as coming within the scope of the invention.

Having thus fully described our invention, what we claim as new and desire to secure by Letters Patent, is:

1. A power transmitting mechanism for a tractor comprising a flywheel, a clutch carried by said flywheel, a power shaft extending from said clutch and actuated thereby, a clutch actuating sleeve surrounding said shaft and slidable longitudinally with respect to the shaft, a second clutch having means connecting the same to said flywheel co-axial with said first clutch, a second power shaft extending from said second clutch and surrounding said sleeve, and bearing means supporting said second power shaft independently of said sleeve.

2. In a tractor, an engine flywheel, a transmission, a clutch carried by said flywheel, a power shaft extending from said clutch to said transmission and having the ends thereof bearinged in said flywheel and said transmission, a second clutch having means connecting the same to said flywheel co-axial with the first clutch, a support member adjacent said second clutch, a second power shaft co-axial with the first power shaft extending from the second clutch and bearinged in said fly wheel and said support, and an actuating sleeve for said transmission clutch slidably positioned upon said first power shaft and between said power shafts, said sleeve extending beyond the bearing means for said second power shaft, said sleeve having one end thereof in engagement with said transmission clutch and the opposite end thereof in engagement with an actuating member to actuate the clutch when said sleeve is reciprocated by said actuating member.

3. In a tractor, an engine flywheel, a transmission, a clutch carried by said flywheel, a power shaft extending from said clutch to said transmission and having the ends thereof bearinged in said flywheel and said transmission, a second clutch having means connecting the same to said flywheel co-axial with the first clutch, a support member adjacent said second clutch, a second power shaft co-axial with the first power shaft extending from the second clutch and bearinged in said flywheel and said support, an actuating sleeve for said transmission clutch slidably positioned upon said first power shaft and between said power shafts, said sleeve extending beyond the bearing means for said second power shaft, said sleeve having one end thereof in engagement with said transmission clutch and the opposite end thereof in engagement with an actuating member to actuate the clutch when said sleeve is reciprocated by said actuating member, and an actuating means for said second clutch slidably positioned upon said second power shaft between said bearings for said shaft.

CLAYTON E. GIFFORD.
JOHN F. HARRISON.